E. KEMPSHALL.
TIRE FOR VEHICLE WHEELS.
APPLICATION FILED JULY 8, 1907.

917,733.

Patented Apr. 6, 1909.

Witnesses
Alice H. Bennett.
Frederick S. Stitt.

Inventor
E. Kempshall
by
Atty.

UNITED STATES PATENT OFFICE.

ELEAZER KEMPSHALL, OF LONDON, ENGLAND, ASSIGNOR TO KEMPSHALL TYRE COMPANY, OF EUROPE, LIMITED, OF LONDON, ENGLAND.

TIRE FOR VEHICLE-WHEELS.

No. 917,733.      Specification of Letters Patent.      Patented April 6, 1909.

Application filed July 8, 1907. Serial No. 382,732.

*To all whom it may concern:*

Be it known that I, ELEAZER KEMPSHALL, of the Hotel Russell, London, W. C., England, manufacturer, a citizen of the United States of America, have invented certain new and useful Improvements in Tires for Vehicle-Wheels, of which the following is a specification.

This invention relates to tires for vehicle wheels, and more particularly to tires employed upon motor-propelled omnibuses and other like vehicles.

The object of the invention is to provide a tread surface of such a nature that it will offer great resistance to side-slip or skidding, will increase the resiliency of the tire, and will present a minimum frictional surface in contact with the road, thus decreasing the heating effect caused by the contact of the tire with the road surface.

The invention consists in forming a series of V-shaped, diamond-shaped, or like angular ridges, projecting considerably above the tread surface of the tire, so that the inclined ridges so formed will resist side-slip, the pockets contained within the ridges will inclose air, which will be compressed as they come into contact with the road and react on the tire to increase its resiliency, and the narrow contact surfaces of the ridges will afford a minimum frictional contact with the road.

Figure 1:
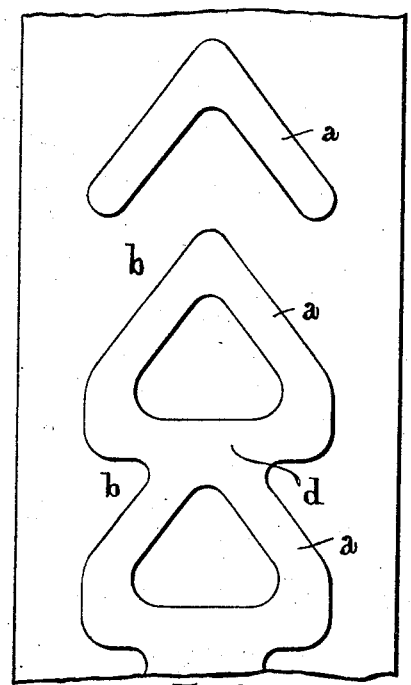
Figure 2:
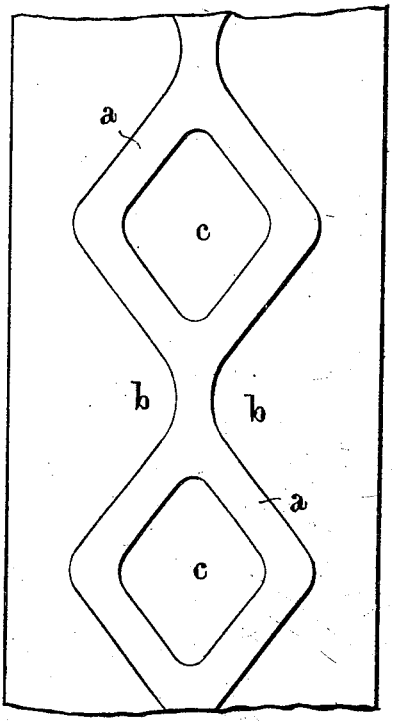
Figure 3:
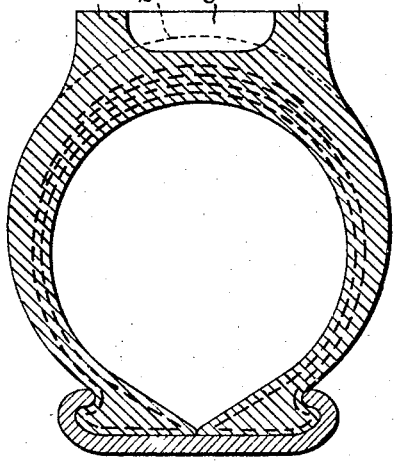
Figure 4:
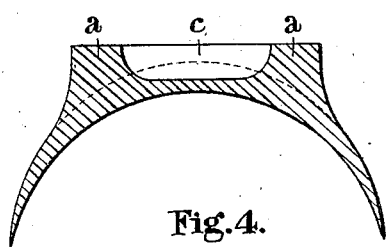

The accompanying drawings illustrate the invention—Figures 1 and 2 being plans of several forms, Fig. 3 a cross-section corresponding thereto; Fig. 4 illustrating the application to a tire band.

In carrying out the invention according to one mode, a series of V-shaped ridges $a$ (Fig. 1) is formed upon the tread surface $b$ of a solid or pneumatic tire, the ridges $a$ projecting considerably above the surface of the tire. The bottom of each pocket $c$ within the ridges preferably goes below the level of the tread surface of the tire—as indicated in Fig. 3—so that, if the ridges wear down, pockets will still exist. The individual ridges all point in the direction of movement, or they may be alternately arranged, so that the one will point in one direction and the next will point in the opposite direction, and so on. Instead of forming simple V-shaped ridges, triangular-shaped ridges may be used, as at $d$ (Fig. 1). In another form, the ridges may be of diamond shape, as shown in Fig. 2. In whatever form the ridges may be used, it is preferred to arrange them so that they are contiguous, in order that a continuous contact surface will be provided, thereby avoiding unnecessary vibration.

The invention is equally applicable to bands adapted to be secured to existing tires, such a band being shown in Fig. 4.

Having thus described my invention, what I claim as new and desire to secure by Letters Patent is:

1. The combination with a wheel tire, of ridges inclosing air pockets, both the inner and outer walls of all the ridges being parallel, and central intermediate ridges connecting the aforesaid ridges, the walls of the latter ridges being parallel, the tread surface of all the ridges being parallel to the geometrical axis of the wheel, so as to present a flat tread to the road surface for the purpose hereinbefore set forth.

2. A tire having ridges inclosing air pockets, the tread surfaces of the ridges being parallel to the geometrical axis of the wheel to present a flat tread to the road surface, the walls of all the ridges being substantially parallel.

In testimony whereof I have signed my name to this specification in the presence of two subscribing witnesses.

ELEAZER KEMPSHALL.

Witnesses:
     JEROME C. JACKSON,
     WALTER J. SKERTEN.